(12) United States Patent
Sconyers

(10) Patent No.: US 11,676,457 B2
(45) Date of Patent: *Jun. 13, 2023

(54) SYSTEM AND METHOD FOR ELECTRONIC ALL-IN GAME

(71) Applicant: BRAIN GAMES, L.C., Dallas, TX (US)

(72) Inventor: Hugh Sconyers, Las Vegas, NV (US)

(73) Assignee: BRAIN GAMES, L.C., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,830

(22) Filed: Dec. 21, 2021

(65) Prior Publication Data

US 2022/0114864 A1 Apr. 14, 2022

Related U.S. Application Data

(63) Continuation of application No. 16/333,969, filed as application No. PCT/US2016/042590 on Jul. 15, 2016, now Pat. No. 11,205,324.

(Continued)

(51) Int. Cl.
G07F 17/32 (2006.01)
A63F 13/00 (2014.01)

(52) U.S. Cl.
CPC .......... G07F 17/3272 (2013.01); A63F 13/00 (2013.01); G07F 17/3209 (2013.01);
(Continued)

(58) Field of Classification Search
CPC ............. G07F 17/3272; G07F 17/3209; G07F 17/3225; G07F 17/3246; G07F 17/3251; G07F 17/3293; A63F 13/00
See application file for complete search history.

(56) References Cited

U.S. PATENT DOCUMENTS 8,348,739 B2 1/2013 Bell et al.
8,740,219 B1 6/2014 Rinaldis
(Continued)

OTHER PUBLICATIONS

PCT: International Preliminary Report on Patentability of PCT/US16/42590 (related application); dated Jan. 16, 2018; 5 pgs.
(Continued)

*Primary Examiner* — Seng H Lim
(74) *Attorney, Agent, or Firm* — Gregory M. Howison

(57) ABSTRACT

An electronic game machine comprises a display, an interface device for receiving input from a human player and a controller. The controller, responsive to initiation of a machine implemented game, prompts the human player to select to play a first player state or a second player state. The controller receives in response to the prompt, an input from the human player through the interface device whereby the human player chooses the first player state or the second player state. The first player state enables the human player to select at least one of at least two predefined selections responsive to a game state and the second player state defines the response of the humane player according to predetermined rules. If the human player has selected the first player state, the controller receives the selection from the human player of the at least one of the at least two predefined selections, determines a predetermined response of the electronic game machine responsive to the selection of the human player and determines an outcome to the machine implemented game responsive to the selection of the human player and the predetermined response of the electronic game machine. If the human player has selected the second player state, the controller automatically responds to selections of the electronic game machine in accordance with the predetermined rules and determines the outcome to the machine implemented game responsive to the automatic responses of the human player. The controller (Continued)

awards the wagered units responsive to the determined outcome. If the human player and the electronic game machine each have remaining wagering units, the controller implements a further round of wagering.

20 Claims, 3 Drawing Sheets

Related U.S. Application Data

(60) Provisional application No. 62/192,949, filed on Jul. 15, 2015.

(52) U.S. Cl.
CPC ...... *G07F 17/3225* (2013.01); *G07F 17/3246* (2013.01); *G07F 17/3251* (2013.01); *G07F 17/3293* (2013.01)

(56) References Cited

U.S. PATENT DOCUMENTS

| | | |
|---|---|---|
| 8,801,522 B2 | 8/2014 | Guinn |
| 2002/0142842 A1 | 10/2002 | Easley et al. |
| 2003/0144052 A1 | 7/2003 | Walker et al. |
| 2005/0179206 A1 | 8/2005 | Cogert |
| 2006/0068498 A1 | 3/2006 | White et al. |
| 2006/0084491 A1 | 4/2006 | DiCarlo et al. |
| 2007/0213112 A1 | 9/2007 | Humphrey et al. |
| 2008/0227549 A1 | 9/2008 | Itskov et al. |
| 2008/0230991 A1 | 9/2008 | Lutnick et al. |
| 2010/0022308 A1 | 1/2010 | Hartmann et al. |
| 2012/0115580 A1 | 5/2012 | Hornik et al. |
| 2012/0123570 A1* | 5/2012 | Guinn ............... G07F 17/32 700/91 |
| 2012/0270626 A1 | 10/2012 | Bell et al. |
| 2013/0210515 A1 | 8/2013 | Snow et al. |
| 2013/0237298 A1 | 9/2013 | Oberberger |
| 2014/0274256 A1 | 9/2014 | Seidenberg et al. |
| 2018/0361251 A1 | 12/2018 | Brew et al. |
| 2019/0206192 A1 | 7/2019 | Mckay |

OTHER PUBLICATIONS

PCT: International Search Report and Written Opinion of PCT/US16/42590 (related application); dated Oct. 7, 2016; 6 pgs.
TheFalcon805; "How to win a poker game against a computer," Jul. 7, 2010; https://www.youtube.com/watch?v=2gUUEshrJbw; accessed Dec. 10, 2020; 10 pages.

* cited by examiner

SYSTEM AND METHOD FOR ELECTRONIC ALL-IN GAME

CROSS-REFERENCE TO RELATED APPLICATIONS

This application is a Continuation of U.S. patent application Ser. No. 16/333,969, filed Mar. 15, 2019, entitled SYSTEM AND METHOD FOR ELECTRONIC ALL-IN GAME, issued as U.S. Pat. No. 11,205,324 on Dec. 21, 2021. U.S. patent application Ser. No. 16/333,969 is a U.S. National Phase application submitted under 35 U.S.C. § 371 of Patent Cooperation Treaty application serial no PCT/US16/42590, filed on Jul. 15, 2016, entitled SYSTEM AND METHOD FOR ELECTRONIC ALL-IN GAME. PCT Application No. PCT/US16/42590 is a Patent Cooperation Treaty of U.S. Provisional Application Ser. No. 62/192,949, filed Jul. 15, 2015, entitled SYSTEM AND METHOD FOR ELECTRONIC ALL-IN GAME. Application Ser. No. 16/333,969, PCT/US16/42590 and 62/192,949 are incorporated by reference in their entirety.

TECHNICAL FIELD

The following disclosure relates to gaming systems machines and methods and more specifically to a novel method and system for an "all in" casino type machine implemented game.

BACKGROUND

As used herein, the term or "game machine" is used to refer to electronic game machines of the type used in casinos. Such machines are typically designed to accept value from a human player in exchange for playing a game of chance. The value may be in the form of cash, game tokens, game tickets, a credit card or stored value card. After receiving the value, the game is played and the machine may dispense a prize, i.e., a "payout" depending on the result of the game.

The most common game machine is the slot machine, a gambling machine with three or more reels which spin when a button or lever is pushed or pulled. However, a slot machine player is not afforded an opportunity to exercise any control over the game, other than pushing a button or pulling a lever to play. Thus, game machines that provide a human player a degree of control, e.g. decision making during play, provide an enhanced experience for the human player and a greater entertainment value.

SUMMARY OF THE INVENTION

In one aspect thereof, a game machine includes a display and an interface device for receiving input from a human player. The game machine further includes a processor that executes preprogrammed instructions in response to an input from the human player entered with the interface device, the processor transmitting instructions to the display to display a game state to the human player. The game machine is also provided with an input device for receiving value from a human player and crediting the human player with a number of wagering units corresponding to the value received or receiving wagering units held by the human player. The input device may be a currency receiver or a card reader for scanning a stored value card.

The game machine also includes a data storage device, the data storage device storing preprogrammed instructions accessed by the processor to initiate and play a machine implemented game, whereby the processor executes the instructions to a) receive an input from a human player with the interface device whereby the human player chooses to be a first or second player, b) randomly generate a first game state for the first player, c) receive an input from the first player selecting one of (i) wager all of the first player's available wagering units, or (ii) decline to play and forfeit a wagering unit to the second player; and d) if the first player wagers, receive a compulsory wager from the second player, randomly generate a second game state for the second player, determine an outcome and award the wagered units to the winning one of the first and second player. If the first and second players each have remaining available wagering units, the processor returns to step b).

In one embodiment, the game machine includes a communications link with a central office wherein preprogrammed instructions for one or more games are downloaded from the central office to the game machine which executes the instructions to play a game with a human player. The game machine includes a display, such as a graphical user interface, for example, a touch screen display, that displays a game state and the players' available wagering units to human player. The game machine may also display a game simulation along with the available wagering units of the first and second player. The game simulation may be, for example, a roll of dice, a spin of a roulette wheel or a draw of a poker hand.

In one embodiment, a method of conducting a game with an electronic game machine includes executing a series of preprogrammed instructions with the electronic game machine to: a) receive an input from a human player with an interface device whereby the human player chooses to be a first or second player, b) randomly generate a first game state for the first player, c) receive an input from the first player selecting to one of (i) wager all of the first player's available wagering units, or (ii) decline to play and forfeit a wagering unit to the second player, d) if the first player wagers, receive a compulsory wager from the second player, and e) randomly generate a second game state for the second player and determine an outcome and award the wagered units to the winning one of the first and second player. If the first and second players have sufficient wagering units available after the conclusion of the game, a new game is initiated.

BRIEF DESCRIPTION OF THE DRAWINGS

For a more complete understanding, reference is now made to the following description taken in conjunction with the accompanying Drawings in which.

DETAILED DESCRIPTION

Figure 1:
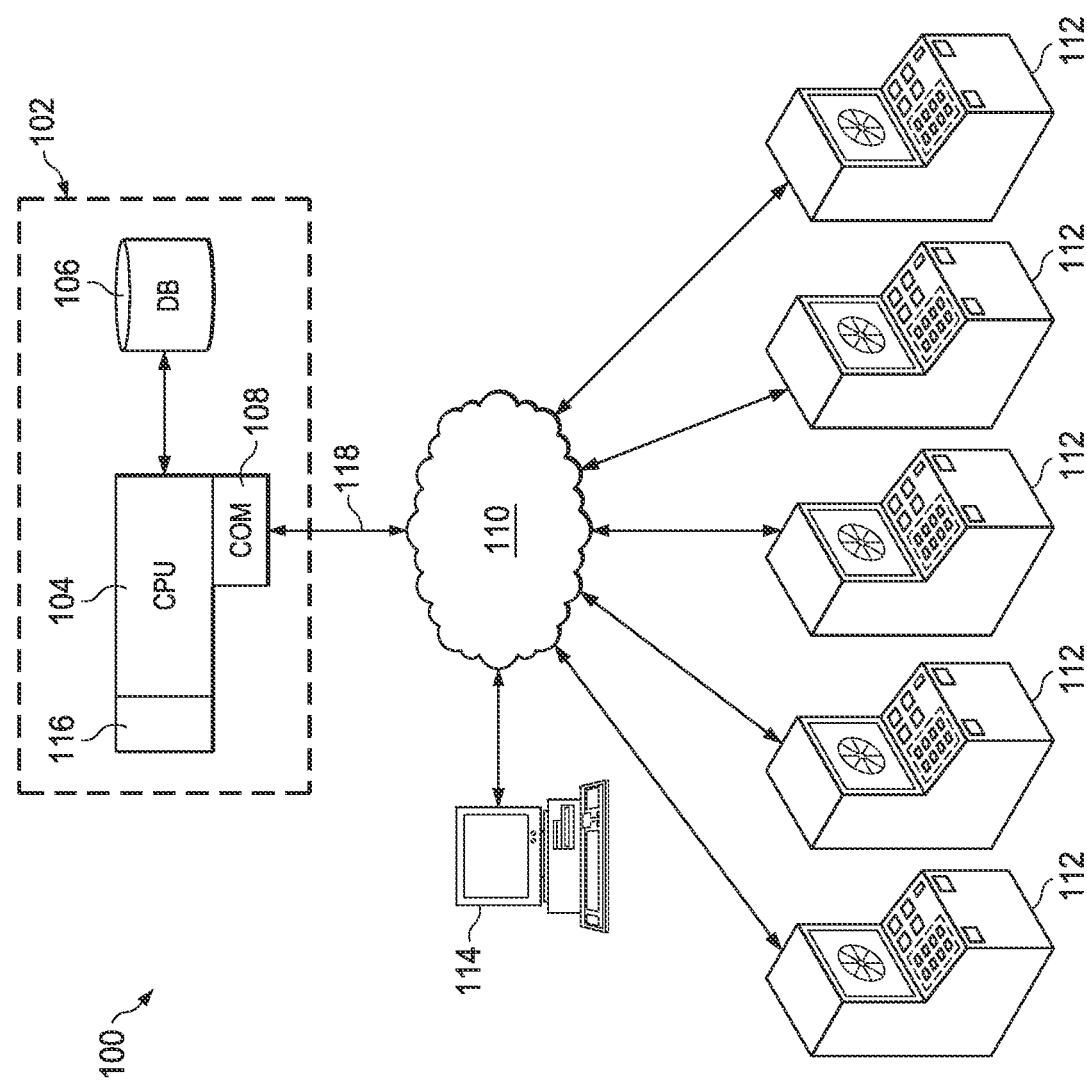
FIG. 1 is a schematic representation of a system for a machine-implemented "all in" game.

Generally, a player who makes an "all in" wager bets his or her entire stake. The player may then stay in the game, regardless of the amount wagered by an opposing player, but may not win any amount greater than the amount of his or her bet. In one embodiment a machine-implemented "all in" casino game starts with first and second players each having a fixed number of wagering units. For example, the first player (either the human or the game machine) may have four units while the second player also starts with a fixed number of wagering units, for example twice as many wagering units as the first player, in this example, eight units. The first player (e.g. the player with the lesser number of wagering units) is dealt a "hand" after which the first player has the option to (1) go "all in," betting all of the player's wagering units on the outcome of the hand or (2) decline to play the hand, in which case the first player forfeits a wagering unit to the second player. If, after one or more hands, the first player holds more wagering units than the second player, the first player must wager a number of wagering units equal to the number of wagering units held by the second player.

If the first player elects to play the hand, the second player is dealt a hand and must match the first player's wager, regardless of the strength of the second player's hand. If the number of wagering units held by the second player is less than the first player's wager, the second player must wager all of the player's available wagering units. The player with the better hand is determined and the winner is awarded the pot. Play continues as long as both players have wagering units.

Since the second player, (e.g. the player initially starting with the larger number of wagering units) has no option other than to match the opposing player's wager, the player may be referred to as the "robot" player. Alternatively, the first player, (e.g. the player initially starting with the smaller number of wagering units) may be referred to as the "option" player, since the first player has the option of making an "all in" wager on the hand or declining to play the hand and forfeiting a wagering unit. Since the first player has the option of playing or forfeiting a wagering unit, the first player starts with a small number of wagering units. The second, or robot player, who must play each hand at the option of the first player, regardless of the relative strength of the second player's hand, therefore starts with a greater number of wagering units.

As will be appreciated, a wide variety of different games that use fixed rules to determine a winner of a random outcome may be used as an "all in" game. For example, one implementation as a casino game may use a simulated roulette wheel to display randomly generated numbers. In this variation, the roulette wheel is "spun" with a random number generator producing a first number which is the option player's "hand" or game state. The option player must then decide whether to continue by placing an "all in" wager or forfeit a wagering unit. If the option player elects to continue, the option player places an "all in" wager, the wheel is "spun" a second time, generating a second random number which is the opposing robot player's "hand" or game state. The player with the larger random number wins and is awarded the "pot" which consists of the option player's and the robot player's wagers. The game continues with successive spins of the wheel until the option player or the robot player has no more units to wager; in other words, goes broke, concluding the game.

In one embodiment, the range of random numbers generated by the roulette "wheel" (e.g. random number generator) may be, for example, from 0 to 100. In order to fund the game and provide the casino a return, if the random number generated is 0 or 100, the casino, represented by the game machine, automatically wins, regardless of whether the game machine is operating as the option player or the robot player. Awarding the pot to the casino when the randomly generated number is 0 or 100 provides the casino with a small percentage of the wagers to fund the game while maintaining the random nature of the game and the apportionment of risk between the human player and the game machine.

When the machine-implemented "all in" game is initiated, the human participant chooses which player, the robot player or the option player, he or she wishes to be with the game machine becoming the opponent by default. Prior to play, the human player may acquire the necessary wagering units by purchasing the wagering units from the casino with cash, a credit card, a debit card or with a dedicated stored value game card purchased from the casino. The dedicated game card may be pre-loaded with wagering units and may be used to tally the human player's winnings and losses during play at the casino.

FIG. 1 is a schematic representation of a system for a machine-implemented "all in" game. As illustrated, system 100 may include a central office 102 having a CPU 104 with an associated data storage unit 106 and a communications interface 108. Central office 102 may communicate via a data link 118 with a network 110, which in turn enables communications between the central office 102 and one or more electronic game machines 112. Network 110 may be a private hard-wired network such as a LAN, a private wireless network and/or a public network such as the Internet, in which case the machine-implemented game may be played with user devices having Internet access. Central office 102 may also communicate via network 110 with an administrative terminal 114 for accounting and/or monitoring game machines 112 from a local or remote location. It will be appreciated that the system may be used in connection with game machines at different locations and may be implemented in the form of a network game whereby users may access and play a machine-implemented game via a private network or a public network such as the Internet.

CPU 104 may download games or similar information stored on data storage unit 106 via data link 118 and network 110 to game machines 112. CPU 104 of central office 102 may also upload information from game machines 112 via network 110 and data link 118. CPU 104 may also provide monitoring functions for monitoring the activity on game machines 112 in real time or at periodic intervals. In one embodiment, CPU 104 implements one or more game engines schematically represented as 116 to control and monitor games played by patrons on electronic game machines 112. Electronic game machines 112 and/or CPU 104, depending upon the particular configuration, may make decisions determined by game rules, probabilities, artificial intelligence and other factors. For example, when electronic game machine 112 is playing as the option player in an "all in" game, actions by the game machine may be determined with an algorithm based on the different probabilities associated with the particular game state at that time.

Figure 2:
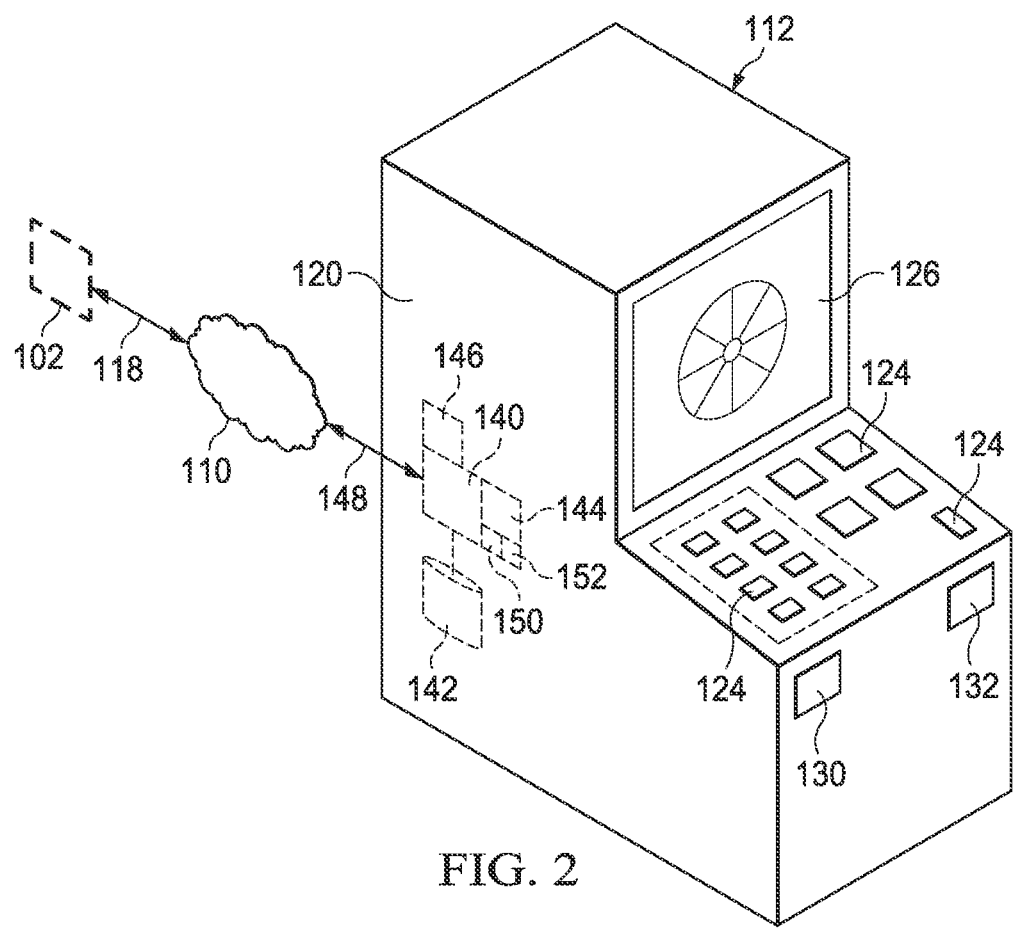
FIG. 2 is a partial perspective view of an electronic game machine of FIG. 1.

FIG. 2 is a partial perspective view of the electronic game machine 112 of FIG. 1. Game machine 112 includes a chassis 120 for mounting a display 126 and one or more user interfaces 124 that allow a human user to interact with the game machine. User interfaces 124 may include a graphical touch screen, keyboard, buttons, levers, or switches that enable the user to play games using game machine 112. Display 126 may comprise a graphical user interface, providing one or more additional user interfaces that may simulate a game in play, such as a roulette wheel, as well as receiving user input. User input will typically be based on a decision to take an action and may be input by the human with the graphical user interface, for example by pressing a "play" or "decline to play" button on the interface. In the case of an "all in" game, the input will be based on a human player's selection of a game, the player's decision to play as an option player or robot player and if the human user elects to play as an option player, to wager or decline to play a hand.

A payment input device 130 allows a user to input a credit card, debit card, smart card, bar coded ticket or other stored value card or token to pay for wagering units. Alternatively, payment input device 130 may be a currency reader. In one embodiment, machine 112 may include a cash, ticket or token dispenser 132 to make cash payments, dispense tokens or tickets to the user or to update the balance on a dedicated stored value card that may be used to record and store a player's position, e.g. the number of wagering units available to the player. The use of a dedicated stored value card enables a player to change game machines, take a break from play or otherwise interrupt play while maintaining a wagering unit balance on the card.

Display 126 provides a human player one interface with the electronic game machine, i.e., it displays an indicia representative of a game or game state. For example, display 126 may present a simulation of a roulette wheel spinning and stopping on a number. In other variations, display 126 may display a simulated poker hand.

Game machine 112 may include a dedicated processor 140 or "brain" and an associated database 142 operatively connected to the processor. In this embodiment, game machine 112 may be a stand-alone unit monitored by central office 102 for audit and accounting purposes. Preprogrammed instructions for different machine-implemented games, suitable for "all in" play, may be downloaded from central office 102 to processor 140 and/or stored on database 142, enabling electronic game machine 112 to play one or more selected games. Processor 140 may utilize a random number generator 144 and access one or more game algorithms 150 and/or game engines 152 to play one or more different "all in" games. Processor 140 may utilize preprogrammed instructions for using display 126 to display game states and simulations to a human player, for example a spin of a roulette wheel, a roll of dice, the chip "stacks" of the players and the draw of a poker "hand" during the course of a selected game.

In different embodiments, game machine 112 may be a "dumb" machine, i.e., controlled on a real time basis by central office 102. Electronic game machine 112 may include a communications interface 146 and a data link 148 with network 110 to provide data transmission between central office 102 and game machine 112. In this embodiment, instructions and programs for executing games may be performed using CPU 104 of central office 102 in response to input by a player utilizing user interface(s) 124. In other words, a machine-implemented game is actually played by CPU 104 on a real time basis rather than by game machine 112. In this embodiment, game results, statistics and disbursements may be reported on a real time basis and/or at the end of each game played. In different variations, instructions and programs for playing a game on electronic game machine 112 may be executed in part on the game machine and in part by CPU 104 of central office 102.

Figure 3:
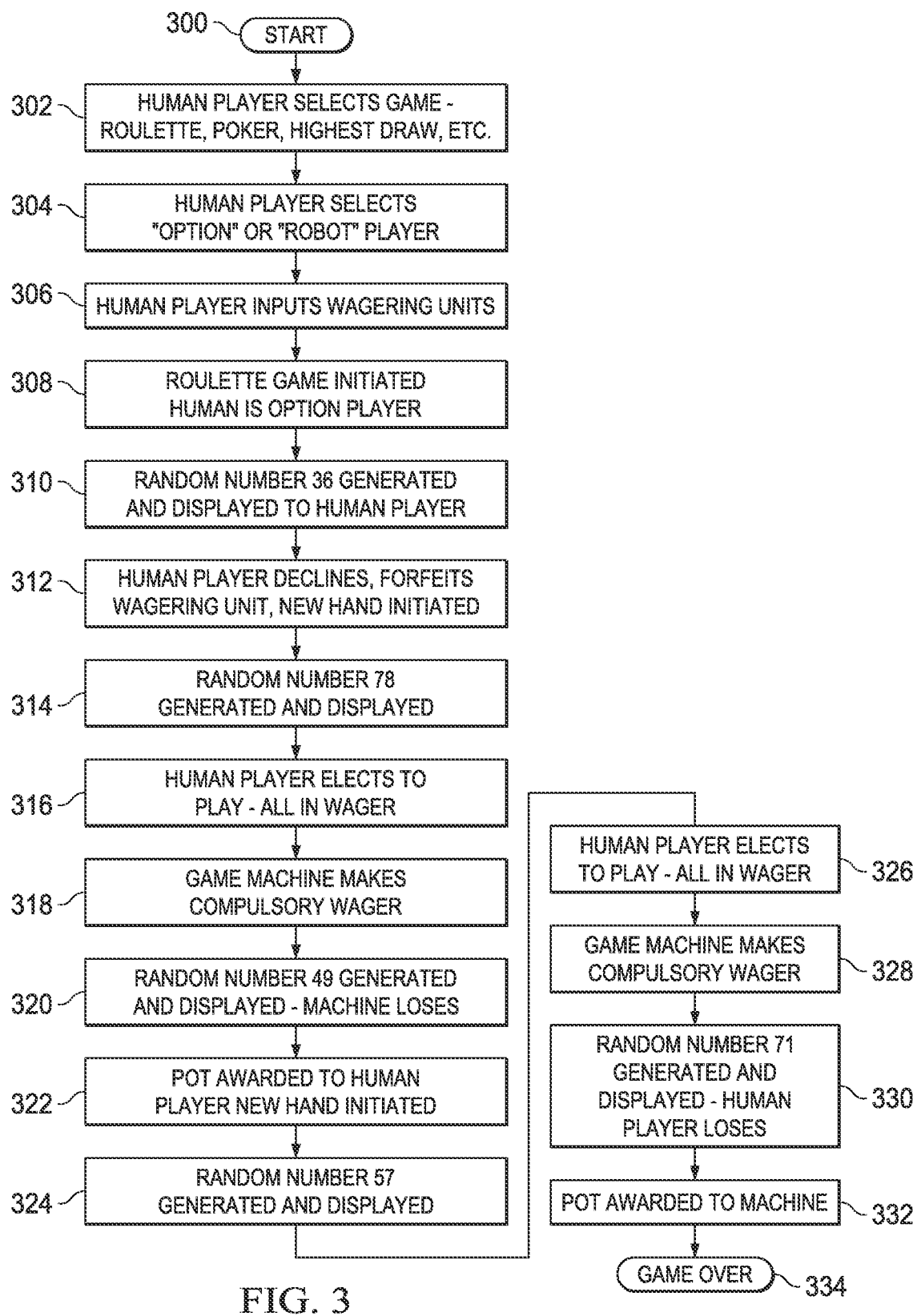
FIG. 3 is a flowchart illustrating play of one machine-implemented "all in" game.

FIG. 3 is a flowchart illustrating play of one machine-implemented "all in" game. The process begins at 300 when a human player initiates a game and selects a particular "all in" game at 302. A variety of games that use fixed rules to determine a winner of a random outcome may be used as an "all in" game. For example, a simulated roulette type wheel spin where the larger randomly generated number wins, a three or five card poker hand with the best hand winning or a simple simulated draw of a single card from a deck with the higher card winning may be adapted as "all in" games. For the purpose of this example, it is assumed that the human player chooses a simulated roulette wheel spin as the "all in" game at 302. In this variation, a random number generator is used to generate a random number with each simulated spin of the roulette wheel, with the larger number winning the hand. In other variations a random selection process may be used to simulate a "draw" of one or more cards, roll dice or simulate other games.

At step 304, the human player may elect to be the option player or the robot player. For the purpose of this example, it is assumed that the human player chooses to participate as the option player and at step 306 inputs 4 wagering units from his or her card or purchases the wagering units in order to play. At step 308, the game is initiated with the human in the position of the option player with a "stack" of 4 available wagering units and the electronic game machine opposing position as the robot player with a "stack" of 8 available wagering units. The wagering unit positions of the human player and the electronic game machine may be represented as a chip "stacks" with display 126.

At step 310 a spin of a roulette type wheel is simulated on display 126 of game machine 112 and a random number of 36 is generated with random number generator 144 and displayed. The randomly generated number 36 is the game state for the human player. The human player's "stack" of 4 wagering units may also be displayed as part of the human player's game state. At this stage, the human, as the option player, can wager all 4 of his or her wagering units on the "hand" of 36 or decline to play and forfeit 1 wagering unit to the game machine. At step 312, the human player elects not to play and forfeits 1 wagering unit to game machine 112 after which a new hand is initiated. At step 314 a spin of a roulette type wheel is simulated on display 126 of game machine 112 and a random number of 78 is generated and displayed. The display may also include the wagering units held by the first player, 3 units, and the second player, six units. The human player elects to play with the "hand" of 78 and makes an "all in" bet of his or her remaining 3 wagering units at step 316. Game machine 112, in the position of the robot player, makes a compulsory bet of 3 wagering units (covering the human's wager) at step 318 and a simulated spin of the roulette wheel results in a randomly generated number 49 at step 320. Display 126 may display a simulation of a spinning spin of a roulette type wheel that stops on the number 49.

With the "hand" of 49, game machine 112 loses the hand to the human player who has a 78 and the pot, containing 6 wagering units, is awarded to the human player at step 322. At this point, the human player and game machine 112 each have a "stack" of 6 available wagering units.

A new hand is initiated and at step 324 the human player receives a randomly generated number of 57 with a simulated spin of the roulette wheel. At step 326 the human player elects to play the "hand" corresponding to the randomly generated number 57 and makes an "all in" bet of 6 wagering units at step 328. Game machine 112 matches the human player's bet with a compulsory wager of 6 units at 328. At step 330, a simulated spin of the roulette wheel produces a randomly generated number 71 for the game machine which is displayed. The human player, with a 57, loses to game machine 112 which holds a "hand" of 71 and the "pot" of 12 wagering units is awarded to game machine 112 at step 332. Since the human player has no remaining wagering units, the game ends at 334. The human player may then initiate a new game by inputting or purchasing additional wagering units. Alternatively, if both the human player and the game machine have available wagering units left to play with after step 332, the process returns to step 322 and a new hand or game is initiated.

Although the preferred embodiment has been described in detail, it should be understood that various changes, substitutions and alterations can be made therein without departing from the spirit and scope of the invention as defined by the appended claims.

What is claimed is:

1. An electronic game machine, comprising:
   a display,
   an interface device, the interface device receiving an input from a human player;
   a processor, the processor executing preprogrammed instructions in response to an input from the human player with the interface device to play a machine implemented game, the processor transmitting instructions to the display to display game states of the machine implemented game to the human player;
   an input device for receiving value from the human player and crediting the human player with a number of wagering units corresponding to the value received;
   a data storage device, the data storage device storing the preprogrammed instructions accessed by the processor to initiate and play the machine implemented game, wherein the machine implemented game is a single-player game in which the human player plays against the electronic game machine, and wherein the human player chooses to participate as either a first player state or a second player state, whereby the processor executes the preprogrammed instructions to:
   a) prompt, by the electronic game machine, the human player to select to play the first player state or the second player state;
   b) receive, upon initiating the machine implemented game and in response to the prompt, an input from the human player through the interface device whereby the human player chooses the first player state or the second player state, wherein the first player state enables the human player to select at least one of at least two predefined selections responsive to a game state and the second player state defines the response of the humane player according to predetermined rules;
   c) randomly generate a first game state;
   d) if the human player has selected the first player state, receive a selection from the human player of the at least one of the at least two predefined selections;
      determine a predetermined response of the electronic game machine responsive to the selection of the human player;
      determine an outcome to the machine implemented game responsive to the selection of the human player and the predetermined response of the electronic game machine;
   e) if the human player has selected the second player state, automatically respond to selections of the electronic game machine in accordance with the predetermined rules;
      determine the outcome to the machine implemented game responsive to the automatic responses;
   f) award wagered units responsive to the determined outcome; and
   g) if the human player and the electronic game machine each have remaining wagering units, return to step c).

2. The electronic game machine of claim 1, wherein the processor further executes the preprogrammed instructions to receive the selection from the human player in the first player state selecting one of (i) wager all of the human player's available wagering units, or (ii) decline to play and forfeit a wagering unit.

3. The electronic game machine of claim 1, wherein the processor further executes the preprogrammed instructions to automatically respond with a number of wagering units defined by the predetermined rules.

4. The electronic game machine of claim 1, wherein the machine implemented game is one of a roll of dice, a spin of a roulette wheel or a draw of a poker hand.

5. The electronic game machine of claim 1 further comprising a communications link with a central office wherein the preprogrammed instructions for the machine implemented game are downloaded from the central office to the electronic game machine which executes the preprogrammed instructions to play the machine implemented game with the human player.

6. The electronic game machine of claim 1 further including if the human player has selected the first player state, determine the predetermined response of the electronic game machine responsive to the predetermined rules and generate a second game state responsive to the predetermined response.

7. The electronic game machine of claim 1 further including if the human player has selected the second player state, receive a selection from the electronic game machine of the at least one of the at least two predefined selections and generate a second game state responsive to the predetermined response.

8. A method of conducting a game with an electronic game machine, wherein the game is a single-player game in which a human player plays against the electronic game machine, comprising:
   a) prompting, by the electronic game machine, the human player to select to play a first player state or a second player state;
   b) receiving, upon initiating a machine implemented game and in response to the prompt, an input from the human player through an interface device whereby the human player chooses the first player state or the second player state, wherein the first player state enables the human player to select at least one of at least two predefined selections responsive to a game state and the second player state defines the response of the human player according to predetermined rules;
   c) randomly generating a first game state;
   d) if the human player has selected the first player state, receiving a selection from the human player of the at least one of the at least two predefined selections;
      determining a predetermined response of the electronic game machine responsive to the selection of the human player;
      determining an outcome to the machine implemented game responsive to the selection of the human player and the predetermined response of the electronic game machine;
   e) if the human player has selected the second player state, automatically responding to selections of the electronic game machine in accordance with the predetermined rules;
      determining the outcome to the machine implemented game responsive to the automatic responses;
   f) awarding wagered units responsive to the determined outcome; and
   g) if the human player and the electronic game machine each have remaining wagering units, returning to step c).

9. The method of claim 8, wherein the step of receiving the selection from the human player in the first player state further comprises selecting one of (i) wager all of the human player's available wagering units, or (ii) decline to play and forfeit a wagering unit.

10. The method of claim 8, wherein the step of automatically responding further comprises automatically responding with a number of wagering units defined by the predetermined rules.

11. The method of claim 8, wherein the machine implemented game is one of a roll of dice, a spin of a roulette wheel or a draw of a poker hand.

12. The method of claim 8 further comprising downloading the machine implemented game from a central office to the electronic game machine over a communications link to play the machine implemented game with the human player.

13. The method of claim 8 further including if the human player has selected the first player state, determining the predetermined response of the electronic game machine responsive to the predetermined rules and generating a second game state responsive to the predetermined response.

14. The method of claim 8 further including if the human player has selected the second player state, receiving a selection from the electronic game machine of the at least one of the at least two predefined selections and generating a second game state responsive to the predetermined response.

15. An electronic game machine, comprising:
a display,
an interface device, the interface device receiving an input from a human player; and
a controller, responsive to initiation of a machine implemented game, that prompts the human player to select to play a first player state or a second player state, receives in response to the prompt, an input from the human player through the interface device whereby the human player chooses the first player state or the second player state, wherein the first player state enables the human player to select at least one of at least two predefined selections responsive to a game state and the second player state defines the response of the humane player according to predetermined rules, the controller randomly generate a first game state, if the human player has selected the first player state, the controller receives a selection from the human player of the at least one of the at least two predefined selections, the controller determines a predetermined response of the electronic game machine responsive to the selection of the human player, the controller determines an outcome to the machine implemented game responsive to the selection of the human player and the predetermined response of the electronic game machine, if the human player has selected the second player state, the controller automatically responds to selections of the electronic game machine in accordance with the predetermined rules and determines the outcome to the machine implemented game responsive to the automatic responses, the controller then awards wagered units responsive to the determined outcome, if the human player and the electronic game machine each have remaining wagering units the controller implements a further round of wagering.

16. The electronic game machine of claim 15, wherein the controller further receives the selection from the human player in the first player state comprising one of (i) wager all of the human player's available wagering units, or (ii) decline to play and forfeit a wagering unit.

17. The electronic game machine of claim 15, wherein the controller further automatically responds with a number of wagering units defined by the predetermined rules.

18. The electronic game machine of claim 15, wherein the machine implemented game is one of a roll of dice, a spin of a roulette wheel or a draw of a poker hand.

19. The electronic game machine of claim 15, wherein if the human player has selected the first player state, the controller determines the predetermined response of the electronic game machine responsive to the predetermined rules and generate a second game state responsive to the predetermined response.

20. The electronic game machine of claim 15, wherein if the human player has selected the second player state, the controller receives a selection from the electronic game machine of the at least one of the at least two predefined selections and generates a second game state responsive to the predetermined response.

* * * * *